United States Patent
Shieh et al.

(10) Patent No.: US 11,394,040 B2
(45) Date of Patent: Jul. 19, 2022

(54) FUEL CELL HEAT RETENTION WITH PHASE CHANGE MATERIAL

(71) Applicants: Toyota Motor Engineering & Manufacturing North America, Inc., Plano, TX (US); Toyota Jidosha Kabushiki Kaisha, Toyota (JP)

(72) Inventors: Tenghua Shieh, Ann Arbor, MI (US); Takeo Yamaguchi, Toyota (JP); Gaohua Zhu, Ann Arbor, MI (US); Debasish Banerjee, Ann Arbor, MI (US); Swetha Minupuri, Farmington Hills, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 222 days.

(21) Appl. No.: 16/586,081

(22) Filed: Sep. 27, 2019

(65) Prior Publication Data
US 2021/0098801 A1 Apr. 1, 2021

(51) Int. Cl.
*H01M 8/04029* (2016.01)
*H01M 8/04007* (2016.01)
(Continued)

(52) U.S. Cl.
CPC ... *H01M 8/04029* (2013.01); *H01M 8/04067* (2013.01); *H01M 8/04074* (2013.01); *H01M 8/249* (2013.01); *H01M 8/2475* (2013.01)

(58) Field of Classification Search
CPC .......... H01M 8/04029; H01M 8/04067; H01M 8/04074; H01M 8/249; H01M 8/2475
See application file for complete search history.

(56) References Cited

U.S. PATENT DOCUMENTS

| 7,352,578 B2 | 4/2008 | Willets et al. |
| 2002/0119357 A1* | 8/2002 | Baldauf ................ H01M 8/241 429/410 |

(Continued)

OTHER PUBLICATIONS

Samsito et al, "Passive thermal management for PEM fuel cell stack under cold weather condition using phase change materials (PCM)," Applied Thermal Engineering 58 (2013) pp. 615-625.
(Continued)

*Primary Examiner* — Milton I Cano
*Assistant Examiner* — Jenna Shulman
(74) *Attorney, Agent, or Firm* — Christopher G. Darrow; Darrow Mustafa PC (57) ABSTRACT

A passive thermal management system is provided for a fuel cell stack, along with methods for maintaining a uniform temperature across a fuel cell stack during cold weather conditions. The system includes a plurality of fuel cells arranged as a fuel cell stack. The fuel cell stack includes a main body portion defining an exterior surface and having first and second opposing end walls. The system includes a first end frame component having a first phase change material in thermal communication with the first end wall. A second end frame component is provided having a second phase change material in thermal communication with the second end wall. An insulation layer is wrapped around the exterior surface of the main body portion and is provided in thermal communication with the plurality of fuel cells.

20 Claims, 7 Drawing Sheets

(51) Int. Cl.
*H01M 8/249* (2016.01)
*H01M 8/2475* (2016.01)

(56) References Cited

U.S. PATENT DOCUMENTS

| | | | |
|---|---|---|---|
| 2006/0127719 A1* | 6/2006 | Brantley | B01J 8/0492 |
| | | | 429/424 |
| 2014/0329161 A1 | 11/2014 | Laurencin et al. | |
| 2015/0372326 A1* | 12/2015 | Hiemer | B60L 50/72 |
| | | | 429/434 |
| 2017/0125866 A1* | 5/2017 | Zhou | H01M 10/60 |
| 2018/0114998 A1 | 4/2018 | Kwon et al. | |
| 2018/0219237 A1 | 8/2018 | Shaikh et al. | |
| 2021/0057793 A1* | 2/2021 | Hendriksen | H01M 10/659 |

OTHER PUBLICATIONS

Haraldsson, K., "On Direct Hydrogen Fuel Cell Vehicles-Modelling and Demonstration, Doctoral Thesis 2005," KTH Chemical Engineering and Technology, Department of Chemical Engineering and Technology Energy Processes, pp. 1-104, Stockholm, Sweden.

* cited by examiner

FUEL CELL HEAT RETENTION WITH PHASE CHANGE MATERIAL

TECHNICAL FIELD

The present disclosure generally relates to fuel cells with heat retention features and, more particularly, to fuel cell stacks using phase change materials to maintain consistent temperatures throughout an entirety of the fuel cell stack.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

In addition to the generation of electricity, two of the main byproducts from the operation of a polymer electrolyte fuel cell (PEMFC) are water and heat. Fuel cell stacks may be exposed to extreme temperature fluctuations, which may include extreme cold. Not only is the efficiency of a PEMFC lower during a cold start, but if exposed to extreme cold temperatures, there is a higher likelihood of freezing of one or more portions of a PEMFC, or even the entire fuel cell stack. Repeated freezing and thawing cycles of a fuel cell or portions of a fuel cell stack can be detrimental to its structure, performance, and use. Various active heaters and heat insulating mechanisms have been used with fuel cells, however, it remains difficult to provide uniform heating throughout an entirety of a fuel cell stack. Still further, current heat insulating mechanisms may not have the ability to provide heat retention for a long enough period of time during more extreme conditions, or may be cost prohibitive for mass production.

Accordingly, it would be desirable to provide improved heat retention capabilities with fuel cell stacks, to minimize additional weight, and to provide uniform temperatures in order to have optimal efficiency.

SUMMARY

This section provides a general summary of the disclosure, and is not a comprehensive disclosure of its full scope or all of its features.

In various aspects, the present teachings provide a passive thermal management system for a fuel cell stack. The system includes a plurality of fuel cells arranged as a fuel cell stack. The fuel cell stack includes a main body portion defining an exterior surface and having first and second opposing end walls. The system includes a first end frame component having a first phase change material in thermal communication with the first end wall. A second end frame component is provided having a second phase change material in thermal communication with the second end wall.

In other aspects, the present teachings provide a fuel cell stack assembly for maintaining a uniform temperature, particularly in cold environments. The system includes a plurality of fuel cells arranged in a stacked orientation within an enclosure. The enclosure has a main body portion defining an exterior surface and having first and second opposing end walls. The assembly includes a first phase change material in thermal communication with the first end wall. A second phase change material is provided in thermal communication with the second end wall. An insulation layer is wrapped around the exterior surface of the main body portion and is provided in thermal communication with the plurality of fuel cells. In various aspects, the assembly includes a first end frame component defining a cavity containing the first phase change material, and a second end frame component defining a cavity containing the second phase change material. A side insulation pad may be provided, located adjacent at least one or both of the first and second end frame components and in thermal communication with the respective phase change material.

In still other aspects, the present teachings provide a method for maintaining a uniform temperature across a fuel cell stack during cold weather conditions. The method includes positioning a first phase change material in thermal communication with a first end wall of a fuel cell stack comprising a plurality of fuel cells, and positioning a second phase change material in thermal communication with a second end wall of the fuel cell stack. The method may include surrounding a main body portion of the fuel cell stack with an insulation layer. In various aspects, the fuel cell stack assembly is configured to maintain a variance in temperature between each of the plurality of fuel cells of less than about 5° C.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally relates to systems and methods providing passive thermal management for a fuel cell stack, and particularly for maintaining a substantially uniform temperature across a fuel cell stack, for example, during cold weather conditions. Aspects described herein relate to thermal communication structures configured for retaining heat within a fuel cell stack. In addition to retaining heat, the present technology maintains a substantially uniform temperature gradient across an entirety of the fuel cells in the fuel cell stack. In this regard, while the temperature of the fuel cell stack may slowly decrease after operation of a vehicle during extreme cold temperatures, there are minimal "hot spots" or "cold spots" within the fuel cell stack, which could otherwise potentially affect efficiency and operation of the fuel cell stack.

The system includes a plurality of fuel cells arranged as a fuel cell stack. The fuel cells may be polymer electrolyte fuel cells (PEMFCs), which may require careful considerations for thermal and water management in cold weather to minimize or prevent residual water freezing and causing thermally induced mechanical stress. The fuel cell stack may be disposed within an enclosure and/or include a main body portion defining an exterior surface and having first and second opposing end walls. The system generally includes a first phase change material in thermal communication with the first end wall. A second second phase change material may be provided in thermal communication with the second end wall. The phase change materials may be located in respective end frame components. Rather than have an entirety of the exterior surface of the fuel cell stack in thermal communication with a phase change material, the present technology selectively aligns a phase change material with limited areas, for example, with opposing end walls of a fuel cell stack, where the opposing end walls are spaced apart from one another. An insulation layer (other than a phase change material) may be provided wrapped around at least a portion of a remainder of the exterior surface of the main body portion and ultimately provided in thermal communication with the plurality of fuel cells.

Figure 1:
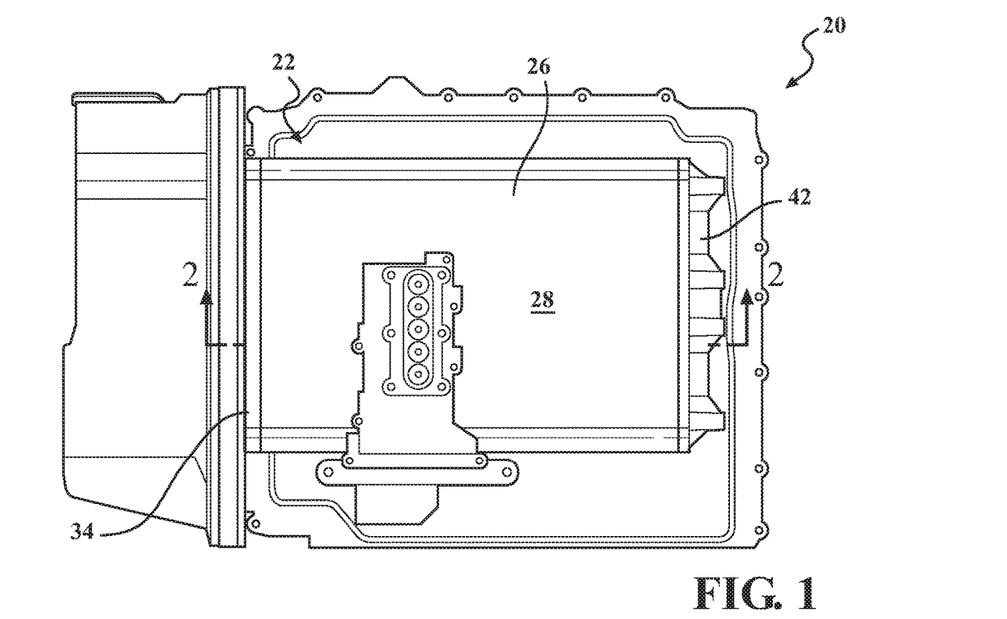
FIG. 1 is a top perspective view of an exemplary fuel cell stack assembly that may be useful with the teachings of the present technology.

FIG. 1 is a top perspective view of an exemplary fuel cell stack assembly 20 that may be useful with the teachings of the present technology. The assembly includes a fuel cell stack 22 including plurality of fuel cells 24 generally arranged in a side-by-side relationship within the fuel cell stack 22. Typically, and depending on the size and type, a single fuel cell may be capable of producing only about 1 volt. Thus, various fuel cell designs link together many individual cells to form a fuel cell stack in order to produce a more useful voltage. A fuel cell stack 22 can be configured with many groups of fuel cells 24 that can be arranged in series and parallel connections, which can be designed to tailor various specifications, such as the voltage, current, and power. It should be understood that certain of the drawings provided herein are schematic and do not represent a scale or necessarily reflect the number of fuel cells 24 that should be used. In various aspects, the number of individual fuel cells 24 contained within one fuel cell stack 22 may be greater than 50, or greater than 100, or even greater than 200, and the particular number can vary significantly with certain fuel cell stack designs. Still further, certain designs may use more than one fuel cell stack 22.

It should be understood that the systems and fuel cell stack assemblies of the present technology may also include various additional components that are not necessarily provided or specifically referenced in the drawings for the sake of simplicity. Exemplary components not shown or described in detail may include heat exchangers, compressors, pumps, humidifiers, separators, filters, electric motors, system modules, intercoolers, control units, cooling circuits, fans, fuel supplies, boost converters, and other Balance of Plant (BoP) system components. Other basic components of the fuel cells not shown herein include electrodes and additional components that may be needed for electrical connections and/or insulation, and/or the flow of fuel and oxidant. Further components include current collectors and separator plates. The current collectors conduct electrons from the anode to the separator plate. The separator plates provide the electrical series connections between cells and physically separate the oxidant flow of one cell from the fuel flow of the adjacent cell. The channels in the current collectors serve as the distribution pathways for the fuel and oxidant. Often, the two current collectors and the separator plate are combined into a single unit called a "bipolar plate."

Figure 2:
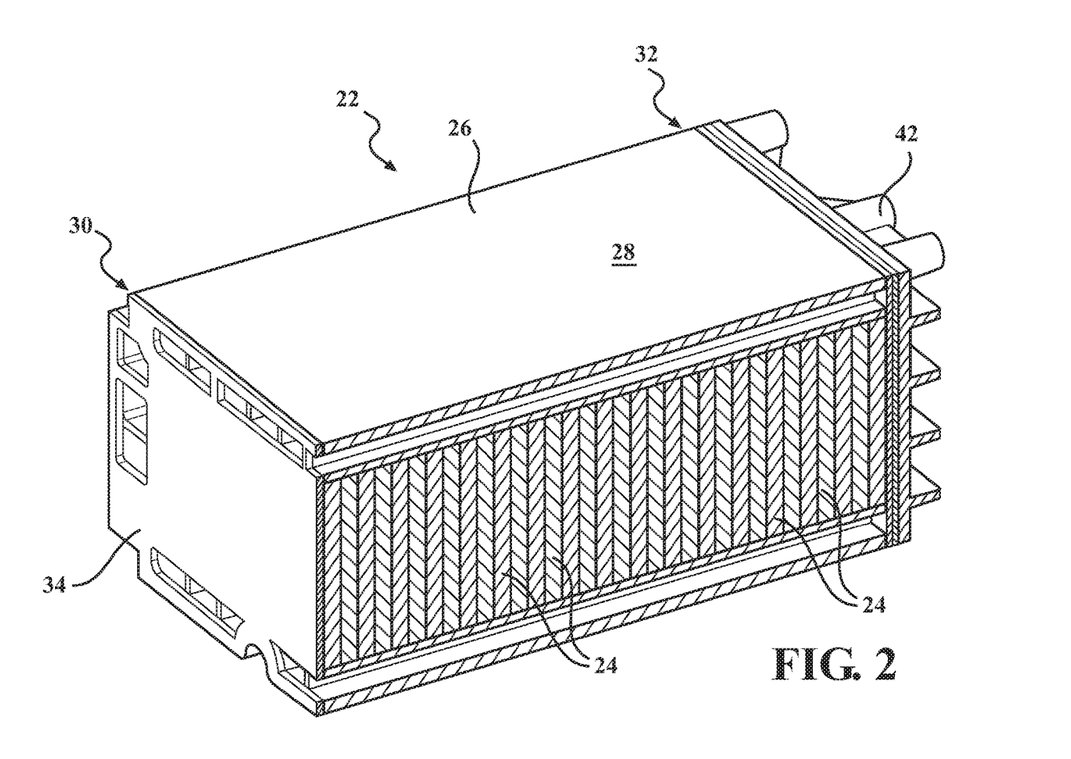
FIG. 2 is a partial cross-sectional side perspective view of the fuel cell stack portion of the assembly as provided in FIG. 1 taken along the line 2-2.
Figure 3:
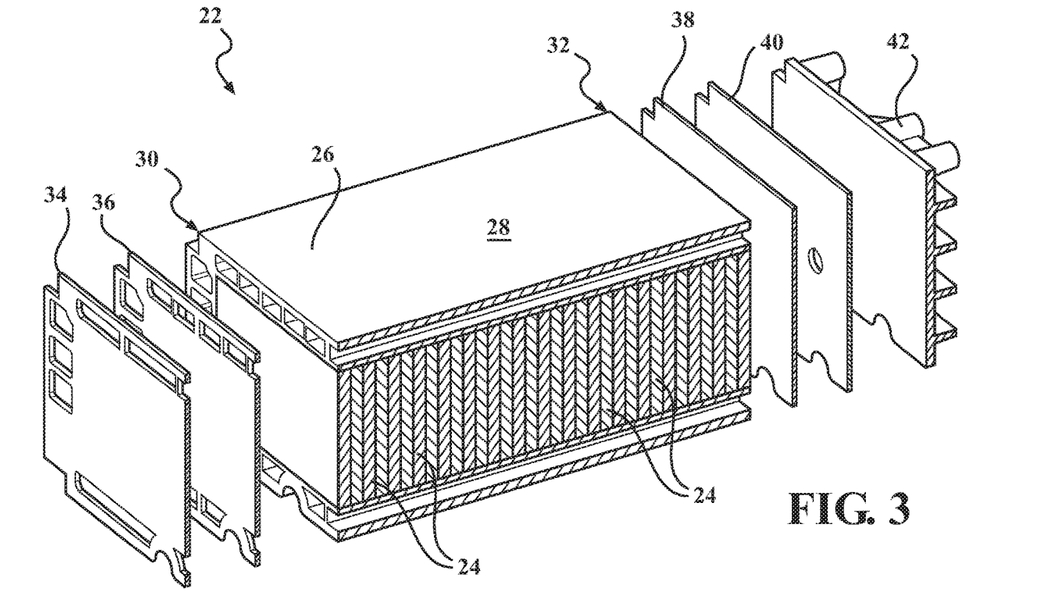
FIG. 3 is an exploded side perspective view of the fuel cell stack as provided in FIG. 2.

FIG. 2 is a partial cross-sectional side perspective view of the fuel cell stack 22 portion of the assembly 20 as provided in FIG. 1 taken along the line 2-2. FIG. 3 is an exploded side perspective view of the fuel cell stack as provided in FIG. 2. As shown, the fuel cell stack 22 has a generally rectangular geometry having a main body portion 26 that either itself defines, or has a cover or enclosure that defines, an exterior surface 28 surrounding a perimeter of the fuel cells 24. The main body portion 26 of the fuel cell stack 22 includes first and second opposing end walls 30, 32. An inlet side end wall 30 may be defined at an inlet side of the fuel cell stack 22 and may be adjacent other fuel cell components such as an end plate 34 and anti-corrosion plate 36. Another end wall 32 may be defined at an opposing end of the main body portion 26 and may be adjacent other fuel cell components such as an anti-corrosion plate 38, a current collector 40, and an opposing end plate 42.

Figure 4:
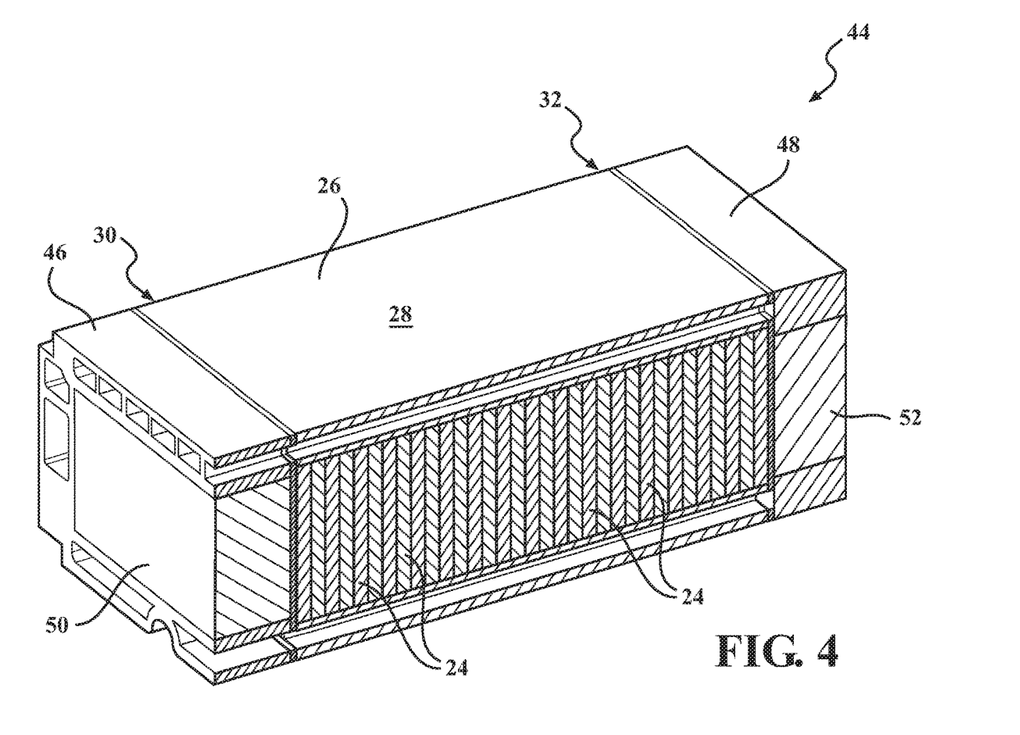
FIG. 4 is a partial side perspective cross-sectional view of a fuel cell stack similar to that provided in FIG. 2 and additionally including first and second opposing end frame components each having a phase change material according to a first aspect of the present technology
Figure 5:
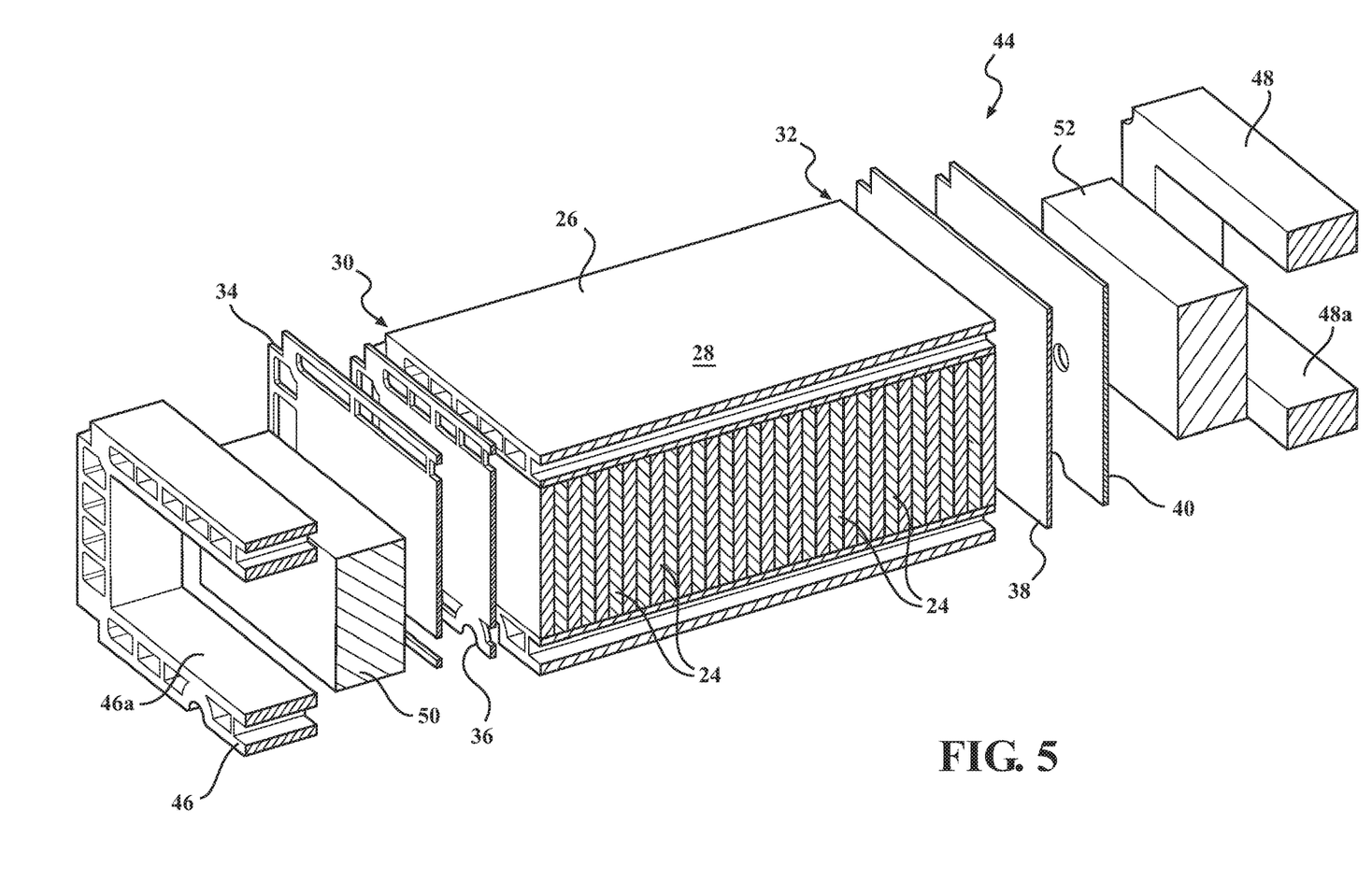
FIG. 5 is an exploded side perspective view of FIG. 4.

FIG. 4 is a partial side perspective cross-sectional view of a fuel cell stack 44 similar to that provided in FIG. 2 and additionally including first and second opposing end frame components 46, 48. FIG. 5 is an exploded side perspective view of FIG. 4. As shown, each of the end frame components 46, 48 define a respective cavity 46a, 48a that is configured for housing a phase change material 50, 52 that is maintained in thermal communication with the respective opposing end walls 30, 32 of the fuel cell stack.

Phase change materials useful with the present technology include any conventional phase change materials that are operable to work in extreme cold conditions that may typically be encountered during a cold start-up of a vehicle. For example, the phase change material should be operable and/or configured to retain heat without degradation at environmental temperatures between the operating temperature of an internal combustion engine and well below the sub-freezing temperatures during winter months. Although the present application may make reference to first and second phase change materials for clarity as to their locations in the fuel cell stack assemblies described herein, the first phase change material may be the same composition as the second phase change material, or the materials may be formed from different phase change materials.

Phase change materials are a class of known materials that can store and release energy through phase transition. For example, the energy may be in the form of heat. The phase change materials usable in the fuel cell stack assemblies described herein may utilize a transition between the liquid and solid phases. When the phase change material is in a solid phase, it absorbs heat as the external temperature rises. The temperature of the phase change material will be the same as the external temperature until the melt point of the phase change material is reached. When the external temperature reaches the melt point of the phase change material, the phase change material will begin to melt, or change phase from a solid to a liquid. During the transition from solid to liquid, the phase change material will absorb large amounts of heat with almost no change in temperature. During this phase change period, the phase change material may provide a cooling effect. A reverse process may occur as the external temperature drops. Then, a phase change material in its liquid phase may release heat as the external temperature decreases and the phase change material changes phase from a liquid phase to a solid phase, thereby providing a warming effect.

The forms of phase change material suitable for use in the fuel cell stack assemblies described herein may depend on the particular design. For some applications, a phase change material in the form of encapsulated phase change material elements suspended in a flowable matrix may be desirable, to facilitate flow of the phase change material into passages in a housing or enclosure. In other applications, the phase change material may be molded or otherwise formed (or incorporated into a matrix which may be molded or formed) into a desired shape that will be maintained during normal use. Phase change materials usable for the purposes described herein and which may be contained or encapsulated into various shapes may include paraffins (wax), fatty acids (oils), polyglycols, salt hydrates, water solutions, and/or other materials. In various presently preferred aspects, a c18 paraffin wax may be used.

Figure 6:
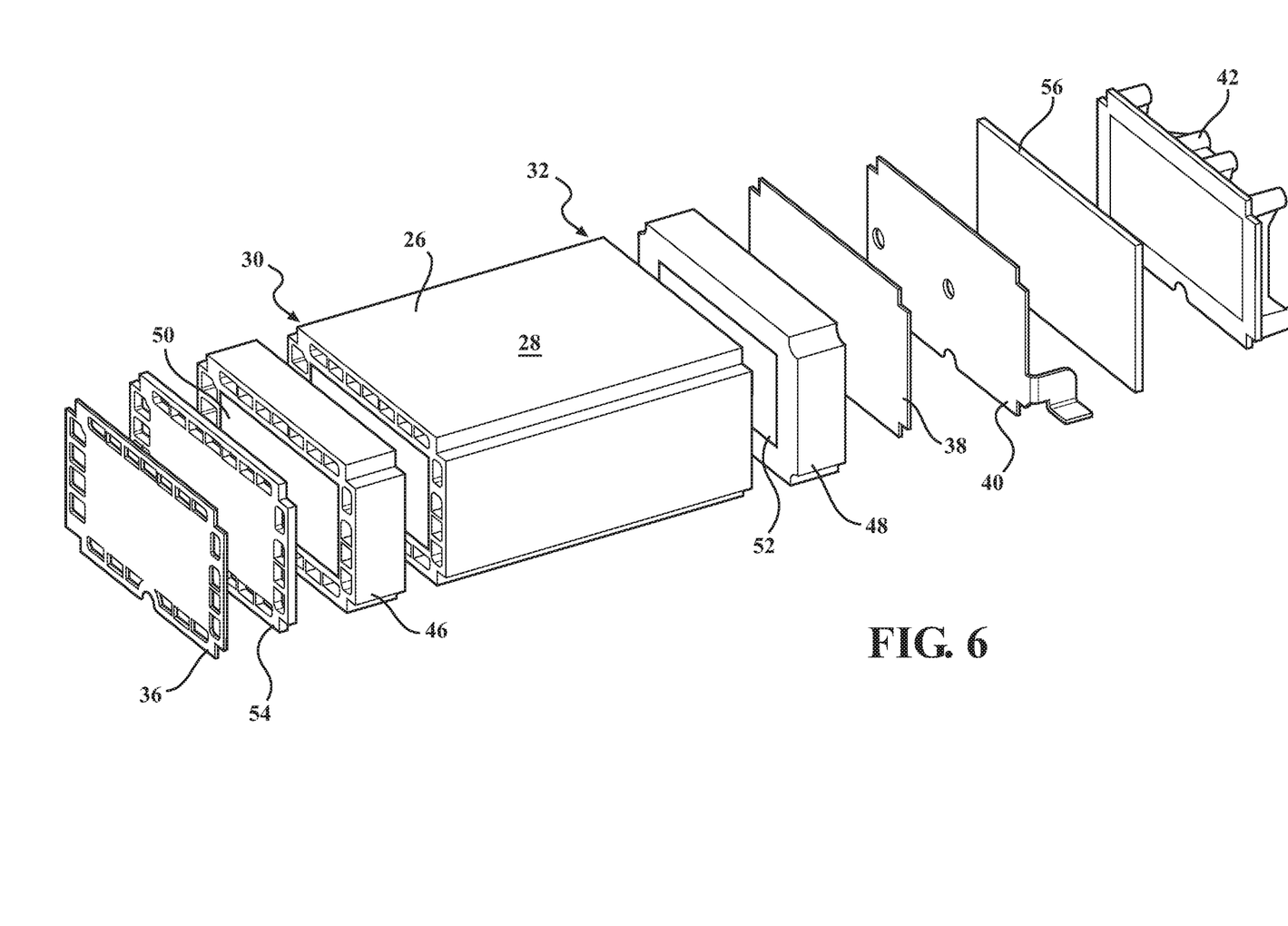
FIG. 6 is an exploded side perspective view of a fuel cell stack according to a second aspect of the present technology.

FIG. 6 is an exploded side perspective view of a fuel cell stack 44 according to a second aspect of the present technology. As shown in FIG. 6, in addition to the first and second opposing end frame components 46, 48 with respective phase change materials 50, 52, at least one side insulation panel 54, 56 is provided and located adjacent the first and second frame components 46, 48. As shown, the side insulation panels are preferably aligned with and provided in thermal communication with the respective phase change materials 50, 52. In various aspects, the side insulation panels 54, 56 may include a flexible insulation such as Aerogel, a vacuum insulated panel, fiber glass, ceramic fiber, mineral wool, polyurethane foam, polystyrene foam, and similar insulating materials. With consideration of performance, material, spacing considerations, and weight limitations, in various aspects the side insulation panels are provided with a thickness dimension of less than about 10 mm, less than about 5 mm, or between about 1 mm to about 4 mm.

Figure 7:
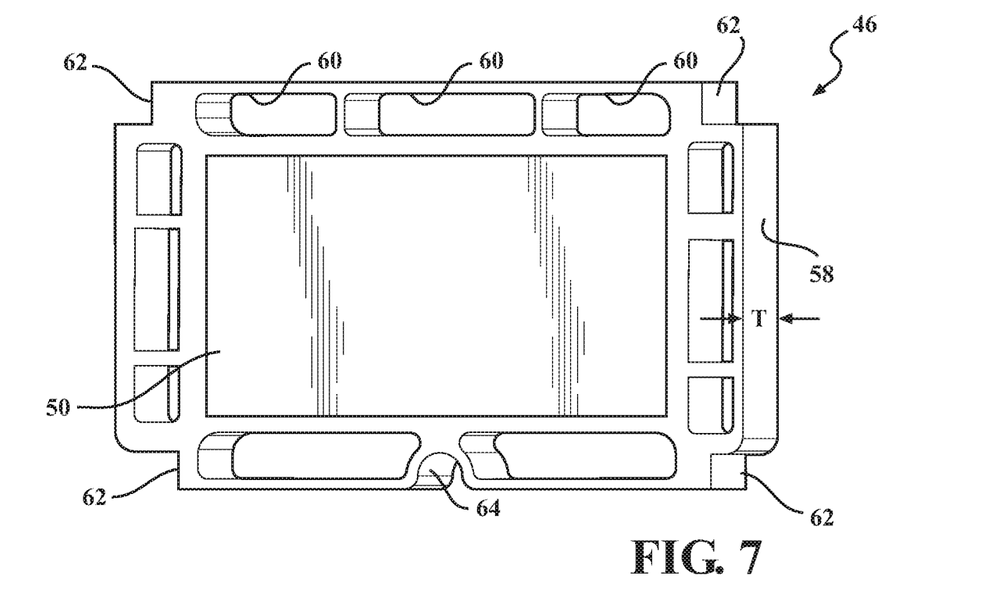
FIG. 7 is a side perspective view of a first exemplary end frame component with a phase change material.
Figure 8:
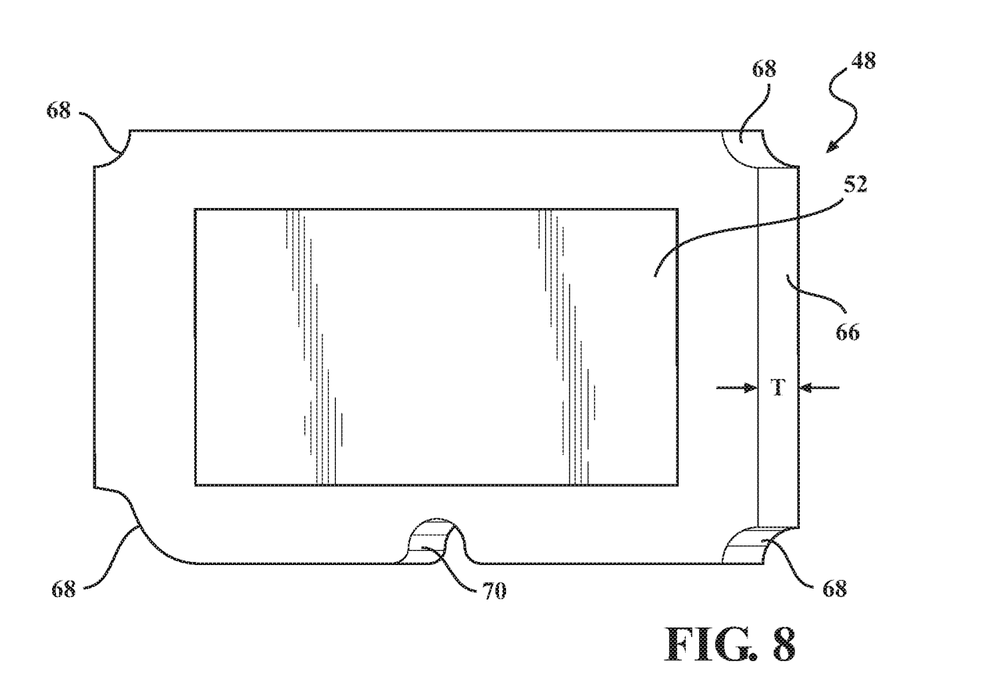
FIG. 8 is a side perspective view of a second exemplary end frame component with a phase change material.

FIG. 7 is a side perspective view of the first end frame component 46 with a phase change material 50, and FIG. 8 is a side perspective view of the second end frame component 48 with a phase change material 52. The first end frame component 46 is generally provided at an inlet side 30 of the fuel cell stack 22 and is shown with a frame member 58 that may define a plurality of channels or openings 60 in order to allow fluid communication from various sources to the fuel cells 24 located within the fuel cell stack 22. The frame member 58 further defines an internal cavity 46a (FIG. 5) that may be used to secure the first phase change material 50 in place and adjacent the end wall 30. Although shown with a single cavity, multiple cavities may be provided. Where more than one cavity is provided, different phase change materials/compositions may be used in the different cavities, if desired. The first end frame component 46 may have an overall geometry or footprint that is commensurate with the geometry or footprint of the end wall 30 of the fuel cell stack 22. For example, a perimeter of the end frame component 46 may be provided with length dimension, a width dimension, and corner areas 62 that are commensurate with a shape of the main body portion 26 of the fuel cell stack 22. Additional passageways 64 may also be defined at various locations of the end frame component 46.

The second end frame component 48 is generally provided at an opposing side end 32 of the main body portion 26 of the fuel cell stack 22. The second end frame component 48 is shown with a frame member 66 that defines an internal cavity 48a (FIG. 5) that may be used to secure the second phase change material 52 in place and adjacent the end wall 32. Similar to the design of the first end frame component 48, although shown with a single cavity, multiple cavities may be provided. Where more than one cavity is provided, different phase change materials/compositions may be used in the different cavities, if desired. The second end frame component 48 may have an overall geometry or footprint that is commensurate with the geometry or footprint of the end wall 32 of the fuel cell stack 22. For example, a perimeter of the end frame component 48 may be provided with length dimension, a width dimension, and corner areas 68 that are commensurate with a shape of the main body portion 26 of the fuel cell stack 22. Additional passageways 70 may also be defined at various locations of the end frame component 46. While not specifically shown, the frame member 66 of the second end frame component 48 may also define a plurality of openings in order to allow fluid communication of other components through to other areas.

The overall thickness dimension of the end frame components 46, 48, referenced by the character "T" is FIGS. 7 and 8 is generally commensurate with the amount of phase change material that is desired to be present, keeping in mind potential space limitations and weight considerations. The thickness of the phase change material may vary by material, design, heat transfer requirements, and required volume, for example, between about 5 mm and about 60 mm, between about 5 mm and about 40 mm, between about 10 mm and about 40 mm, or between about 10 mm and about 20 mm. The frame members 58, 66 are generally provided with a thickness dimension that is suitable for their desired integrity. In various aspects, the frame members 58, 66 are made from high strength and corrosion resistant materials. In various preferred aspects, the frame members 58, 66 or other portions of the end frame components 46, 48 may be made of titanium or graphite.

Figure 9:
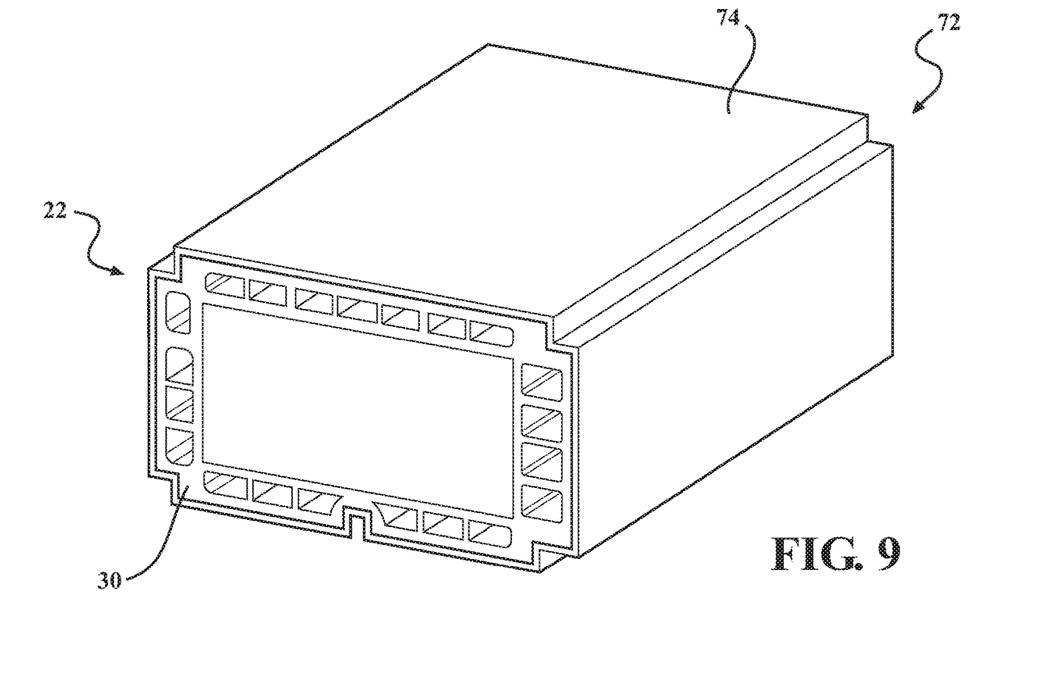
FIG. 9 is a side perspective view of a fuel cell stack with an insulation layer wrapped around an exterior surface thereof.
Figure 10:
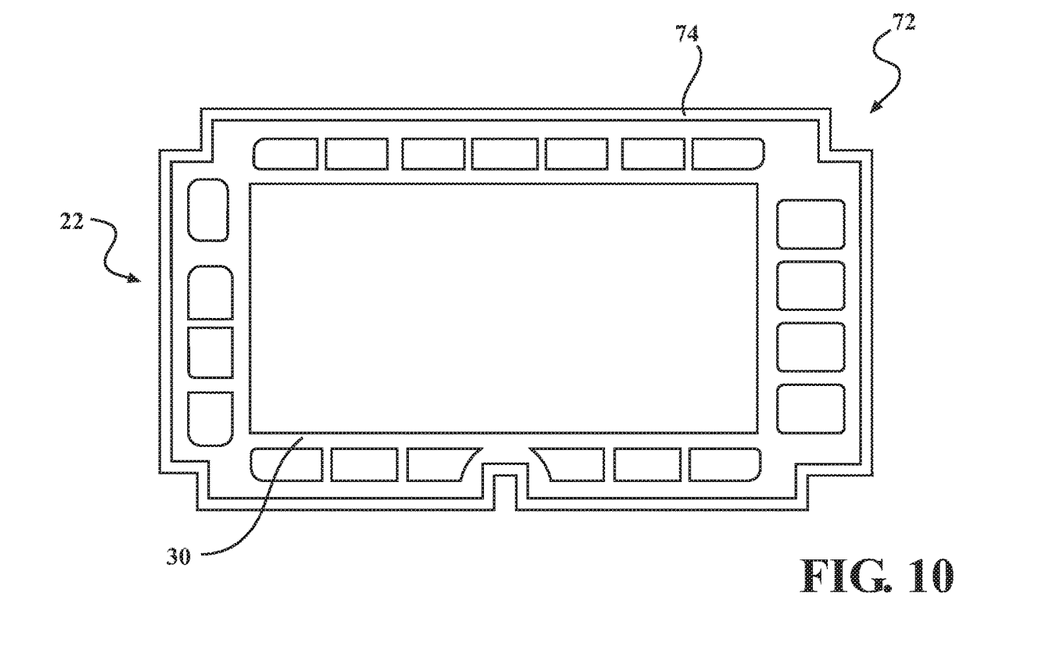
FIG. 10 is a side plan view of the fuel cell stack with an insulation layer as shown in FIG. 9.

In order to increase the uniformity in temperature between fuel cells 24 located throughout the entirety of the fuel cell stack, the present technology additionally provides insulation around the main body portion 26 of the fuel cell stack 22 that may not otherwise be provided adjacent a phase change material. The insulation can be located around a certain portion or region of the exterior surface 28, or can be provided surrounding an entirety of the exterior surface, not including the end walls 30, 32. FIG. 9 is a side perspective view of a fuel cell stack 72 with an insulation layer 74 wrapped around an entirety of the exterior surface thereof that is in thermal communication with the fuel cell stack. FIG. 10 is a side plan view of the fuel cell stack with an insulation layer as shown in FIG. 9. In various aspects, the insulation layer 74 may include materials similar to the side insulation panels 54, 56, including a flexible insulation such as Aerogel, a vacuum insulated panel, fiber glass, ceramic fiber, mineral wool, polyurethane foam, polystyrene foam, and similar insulating materials. With consideration of performance, material, spacing considerations, and weight limitations, in various aspects the side insulation panels are provided with a thickness dimension of less than about 15 mm, less than about 10 mm, or between about 5 mm to about 10 mm. In various aspects, the insulation layer 74 may be mechanically or adhesively coupled to the exterior surface 28 of the fuel cell stack 22 or coupled to an optional cover or enclosure. In other aspects, the insulation layer 74 can be provided as a sandwiched component disposed between an exterior surface 28 of the fuel cell stack 22 and an optional cover or enclosure. The insulation layer 74 may be provided as a single layer or multiple layers.

Figure 11:
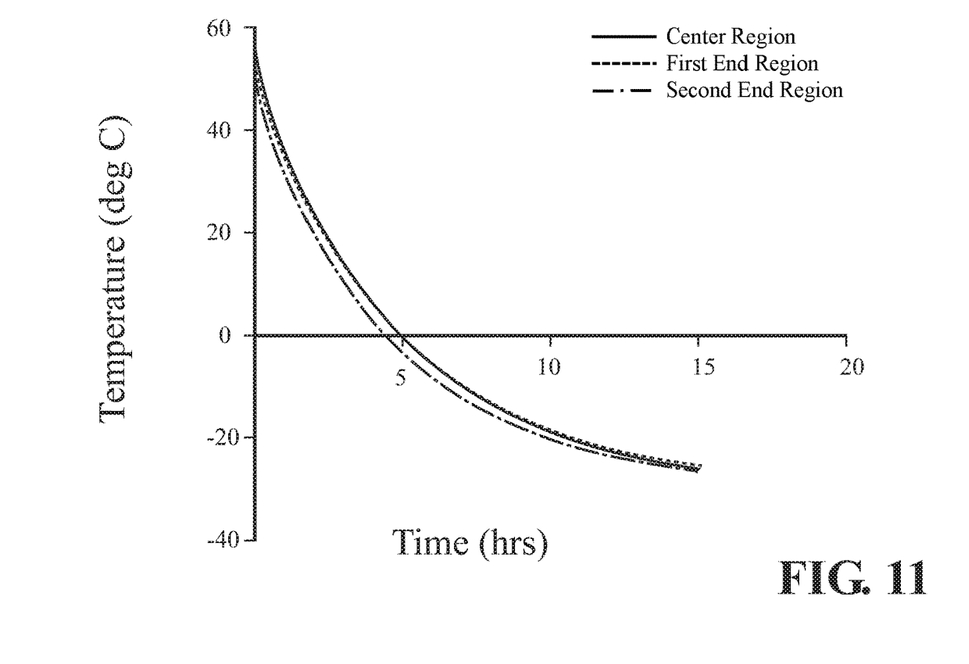
FIG. 11 is a graph illustrating baseline conditions of the temperature of a fuel cell stack as a function of time after shut-down.

FIG. 11 is a graph illustrating baseline conditions of the temperature of a fuel cell stack as a function of time after shut-down. There are three plotted lines indicative of temperature readings that are recorded from the middle area of the fuel cell stack and close to the two opposing ends of the fuel cell stack. The temperature readings are taken from a region near the bottom area of the fuel cell stack. As indicated, the internal temperature falls below the freezing temperature at about 5 hours after shut-down.

Figure 12:
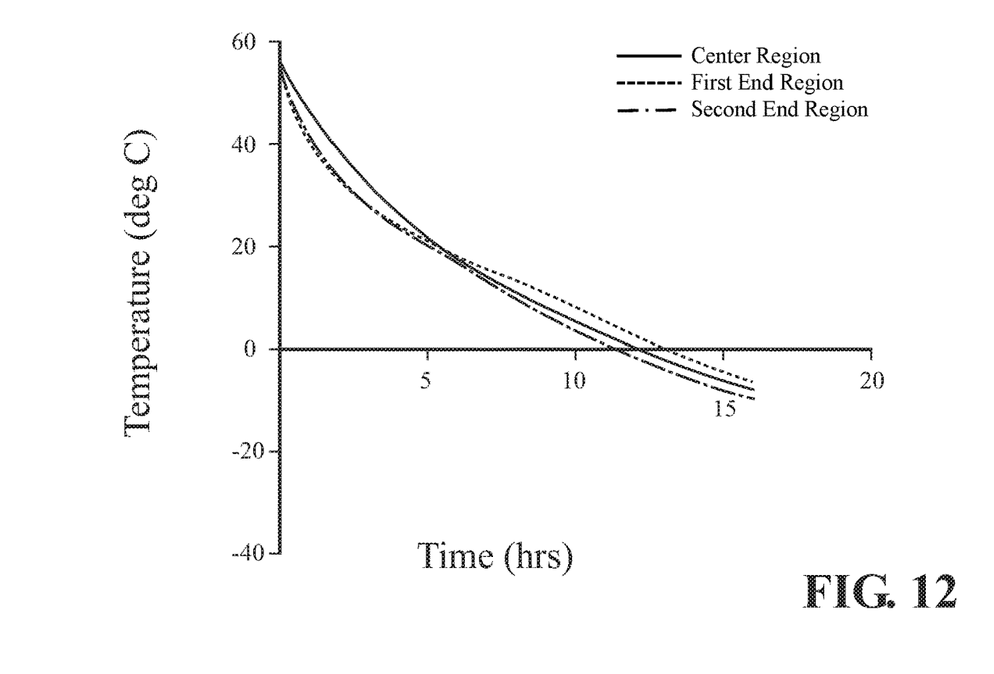
FIG. 12 is a graph illustrating the temperature of a fuel cell stack assembly as a function of time after shut-down with a fuel cell stack assembly made according to the present teachings incorporating a phase change material and insulation layer design.

FIG. 12 is a graph illustrating the temperature of a fuel cell stack assembly as a function of time after shut-down with a fuel cell stack assembly made according to the present teachings with a phase change material and insulation layer design. Similar to FIG. 11, there are three plotted lines indicative of temperature readings that are recorded from the middle area of the fuel cell stack and close to the two opposing ends of the fuel cell stack, with the temperature readings taken from a region near the bottom area of the fuel cell stack. As indicated, the internal temperature falls below the freezing temperature only after more than 10 hours has passed after shut-down. In various aspects, the temperature variation between fuel cells, or different areas in the stack, remains substantially uniform. For example, the fuel cell stack assembly is configured to maintain a variance in temperature between each of the plurality of fuel cells of less than about 5° C. for at least 11 hours after operation of the fuel cell stack ceases, and prior to dropping below freezing temperatures. This is based on soaking 12 hours in −30° C. conditions. The smaller the temperature variation, the better the performance. Without using the PCM and insulating materials of the present technology, the temperature of fuel cell stack will be influenced by the heat passage on both ends, and the thermal mass connected to the fuel cell stack. The variation in temperature between the two opposing ends is due, in part, to the many accessories connect to one end. Thus, it may tend to remain warmer than the other end without the accessories. The center portion of stack will stay warmer when the heat is transmitted through the surface of stack. With both the PCM and insulators on two ends and surrounding the fuel cell stack, uniform temperature covering an entire length of the fuel cell stack can be achieved.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A passive thermal management system for a fuel cell stack, the system comprising:
   a plurality of fuel cells arranged as the fuel cell stack, the fuel cell stack having a main body portion defining an exterior surface and having a first end wall and a second end wall opposing the first end wall;
   a first end frame component defining a first cavity;
   a first phase change material housed in the first cavity and in thermal communication with the first end wall;
   a second end frame component defining a second cavity; and
   a second phase change material housed in the second cavity and in thermal communication with the second end wall, wherein at least one of the first end frame component and the second end frame component defines a plurality of fluid channels for fluid communication with the plurality of fuel cells.

2. The passive thermal management system according to claim 1, wherein at least one of the first and second phase change materials comprises a c18 paraffin wax.

3. The passive thermal management system according to claim 1, wherein at least one of the first and second end frame components comprises titanium.

4. The passive thermal management system according to claim 1, wherein at least one of the first and second end frame components comprises graphite.

5. The passive thermal management system according to claim 1, wherein at least one of the first phase change material and the second phase change material has a thickness dimension of between about 10 mm and about 20 mm.

6. The passive thermal management system according to claim 1, further comprising an insulation layer wrapped around the exterior surface of the main body portion and in thermal communication with the fuel cell stack.

7. The passive thermal management system according to claim 6, wherein the insulation layer is provided with a thickness dimension of between about 5 mm to about 10 mm.

8. The passive thermal management system according to claim 1, further comprising a side insulation panel located adjacent at least one of the first and second end frame components and in thermal communication with the first and second phase change material, respectively.

9. The passive thermal management system according to claim 8, wherein the side insulation panel is provided with a thickness dimension of between about 1 mm to about 4 mm.

10. A fuel cell stack assembly for maintaining a uniform temperature, the fuel cell stack assembly comprising:
a plurality of fuel cells arranged in a stacked orientation within an enclosure, the enclosure having a main body portion defining an exterior surface and having a first end wall and a second end wall opposing the first end wall;
a first end frame component defining a first cavity;
a first phase change material housed in the first cavity and in thermal communication with the first end wall;
a second end frame component defining a second cavity;
a second phase change material housed in the second cavity and in thermal communication with the second end wall, wherein at least one of the first end frame component and the second end frame component defines a plurality of fluid channels for fluid communication with the plurality of fuel cells; and
an insulation layer wrapped around the exterior surface of the main body portion and in thermal communication with the plurality of fuel cells.

11. The fuel cell stack assembly according to claim 10 further comprising a side insulation panel located adjacent at least one of the first and second end frame components and in thermal communication with the first and second phase change material, respectively.

12. The fuel cell stack assembly according to claim 11, wherein the side insulation panel is provided with a thickness dimension of between about 1 mm to about 4 mm.

13. The fuel cell stack assembly according to claim 10, wherein at least one of the first phase change material and the second phase change material has a thickness dimension of between about 10 mm and about 20 mm.

14. The fuel cell stack assembly according to claim 10, wherein the insulation layer is provided with a thickness dimension of between about 5 mm to about 10 mm.

15. The fuel cell stack assembly according to claim 10, wherein the fuel cell stack assembly is configured to maintain a variance in temperature between each of the plurality of fuel cells of less than about 5° C.

16. The passive thermal management system according to claim 1 further comprising a first end plate between the first end wall and the first end frame component.

17. The passive thermal management system according to claim 16 further comprising a first anti-corrosion plate between the first end plate and the first end frame component.

18. The passive thermal management system according to claim 17 further comprising a second end plate between the second end wall and the second end frame component.

19. The passive thermal management system according to claim 18 further comprising a second anti-corrosion plate between the second end plate and the second end frame component.

20. The fuel cell stack assembly according to claim 10 further comprising:
a first end plate between the first end wall and the first end frame component;
a first anti-corrosion plate between the first end plate and the first end frame component;
a second end plate between the second end wall and the second end frame component; and
a second anti-corrosion plate between the second end plate and the second end frame component.

* * * * *